United States Patent
Marcin et al.

(10) Patent No.: US 9,965,559 B2
(45) Date of Patent: May 8, 2018

(54) PROVIDING AUTOMATIC ACTIONS FOR MOBILE ONSCREEN CONTENT

(71) Applicant: GOOGLE INC., Mountain View, CA (US)

(72) Inventors: David Marcin, Sunnyvale, CA (US); Rajan Patel, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 373 days.

(21) Appl. No.: 14/465,265

(22) Filed: Aug. 21, 2014

(65) Prior Publication Data

US 2016/0055246 A1    Feb. 25, 2016

(51) Int. Cl.
  *G06F 7/00* (2006.01)
  *G06F 17/30* (2006.01)
  *G06F 17/27* (2006.01)

(52) U.S. Cl.
  CPC ...... *G06F 17/30867* (2013.01); *G06F 17/278* (2013.01); *G06F 17/30864* (2013.01); *G06F 17/30964* (2013.01)

(58) Field of Classification Search
  CPC ............ G06F 17/30864; G06F 17/278
  See application file for complete search history.

(56) References Cited

U.S. PATENT DOCUMENTS

| | | | |
|---|---|---|---|
| 5,731,844 A * | 3/1998 | Rauch | G11B 27/028 348/564 |
| 5,946,647 A | 8/1999 | Miller et al. | |
| 6,662,226 B1 | 12/2003 | Wang et al. | |
| 7,054,917 B1 | 5/2006 | Kirsch et al. | |
| 7,421,153 B1 | 9/2008 | Ronca et al. | |
| 7,548,915 B2 | 6/2009 | Ramer et al. | |

(Continued)

FOREIGN PATENT DOCUMENTS

| | | |
|---|---|---|
| CN | 101075236 A | 11/2007 |
| CN | 101201827 A | 6/2008 |

(Continued)

OTHER PUBLICATIONS

U.S. Appl. No. 14/451,385, filed Aug. 4, 2014, 109 pages.

(Continued)

*Primary Examiner* — Charles Lu
(74) *Attorney, Agent, or Firm* — Brake Hughes Bellermann LLP

(57) ABSTRACT

Implementations provide an interface for initiating actions related to content the user is viewing on a mobile device. A method includes performing recognition on content captured from a display of a mobile device and identifying a plurality of entities in the content. The method may include issuing a query for each of the plurality of entities, ranking the plurality of entities based on the search results, generating an action card for at least some of the highest ranked entities, and providing the action cards for display on the mobile device. Alternatively or additionally, the method may include determining at least one contact in a contacts data store that corresponds to an entity and generating an action card for the entity, the action card having a first action that uses first information from the contacts data store and a second action that uses second information from the contacts data store.

21 Claims, 7 Drawing Sheets

(56) References Cited

U.S. PATENT DOCUMENTS

| | | |
|---|---|---|
| 7,822,759 B2 | 10/2010 | MacLaurin et al. |
| 7,917,514 B2 | 3/2011 | Lawler et al. |
| 8,090,222 B1 | 1/2012 | Baluja et al. |
| 8,131,786 B1 | 3/2012 | Bengio et al. |
| 8,150,911 B2 | 4/2012 | Bell et al. |
| 8,204,966 B1 | 6/2012 | Mendis et al. |
| 8,255,386 B1 | 8/2012 | Annau et al. |
| 8,280,414 B1 | 10/2012 | Nourse et al. |
| 8,341,156 B1 | 12/2012 | Westgate et al. |
| 8,347,237 B2 | 1/2013 | Bier et al. |
| 8,418,055 B2 | 4/2013 | King et al. |
| 8,452,799 B2 | 5/2013 | Zhou et al. |
| 8,468,110 B1 | 6/2013 | Podgorny et al. |
| 8,571,319 B2 | 10/2013 | Balasubramanian et al. |
| 8,645,325 B2 | 2/2014 | Anderson et al. |
| 8,671,341 B1 | 3/2014 | Hellwig et al. |
| 8,700,604 B2 | 4/2014 | Roseman et al. |
| 8,767,497 B2 | 7/2014 | Marumoto et al. |
| 8,799,061 B1 | 8/2014 | Chatterjee et al. |
| 8,954,836 B1 | 2/2015 | Look et al. |
| 8,977,639 B2 | 3/2015 | Petrou et al. |
| 9,165,406 B1 | 10/2015 | Gray et al. |
| 9,176,984 B2 | 11/2015 | Hull et al. |
| 9,276,883 B2 | 3/2016 | Zhang et al. |
| 9,354,778 B2 | 5/2016 | Cornaby et al. |
| 9,424,668 B1 | 8/2016 | Petrou et al. |
| 9,582,482 B1 | 2/2017 | Sharifi et al. |
| 9,703,541 B2 | 7/2017 | Sharifi et al. |
| 9,762,651 B1 | 9/2017 | Sharifi et al. |
| 9,788,179 B1 | 10/2017 | Sharifi et al. |
| 9,798,708 B1 | 10/2017 | Sharifi et al. |
| 9,811,352 B1 | 11/2017 | Sharifi et al. |
| 9,824,079 B1 | 11/2017 | Sharifi et al. |
| 2004/0117750 A1 | 6/2004 | Skoll et al. |
| 2005/0083413 A1 | 4/2005 | Reed et al. |
| 2006/0047639 A1 | 3/2006 | King et al. |
| 2006/0080594 A1 | 4/2006 | Chavoustie et al. |
| 2006/0106844 A1 | 5/2006 | Naick et al. |
| 2006/0156222 A1 | 7/2006 | Chi et al. |
| 2006/0221409 A1 | 10/2006 | Cohen et al. |
| 2006/0253491 A1 | 11/2006 | Gokturk et al. |
| 2007/0008321 A1 | 1/2007 | Gallagher et al. |
| 2007/0047781 A1 | 3/2007 | Hull et al. |
| 2007/0143345 A1* | 6/2007 | Jones ................ G06F 17/30241 |
| 2007/0168379 A1 | 7/2007 | Patel et al. |
| 2007/0233671 A1 | 10/2007 | Oztekin et al. |
| 2008/0176606 A1 | 7/2008 | Kim |
| 2008/0235018 A1* | 9/2008 | Eggen ..................... G10L 15/26 |
| | | 704/251 |
| 2008/0275701 A1* | 11/2008 | Wu ................... G06F 17/30017 |
| | | 704/235 |
| 2008/0281974 A1 | 11/2008 | Slothouber et al. |
| 2008/0301101 A1 | 12/2008 | Baratto et al. |
| 2008/0313031 A1 | 12/2008 | Li et al. |
| 2009/0005003 A1 | 1/2009 | Hartwell |
| 2009/0006388 A1 | 1/2009 | Ives et al. |
| 2009/0036215 A1 | 2/2009 | Saeki |
| 2009/0063431 A1 | 3/2009 | Erol et al. |
| 2009/0138466 A1 | 5/2009 | Henry et al. |
| 2009/0228573 A1* | 9/2009 | Asakawa ............ G09B 21/006 |
| | | 709/218 |
| 2009/0228777 A1 | 9/2009 | Henry et al. |
| 2009/0252413 A1 | 10/2009 | Hua et al. |
| 2009/0282012 A1 | 11/2009 | Konig et al. |
| 2009/0319449 A1 | 12/2009 | Gamon et al. |
| 2010/0010987 A1 | 1/2010 | Smyth et al. |
| 2010/0060655 A1 | 3/2010 | Huang |
| 2010/0088612 A1 | 4/2010 | Jia et al. |
| 2010/0250598 A1 | 9/2010 | Brauer et al. |
| 2010/0262928 A1 | 10/2010 | Abbott |
| 2010/0306249 A1 | 12/2010 | Hill et al. |
| 2010/0313141 A1 | 12/2010 | Yu et al. |
| 2011/0072455 A1 | 3/2011 | Pickelsimer et al. |
| 2011/0125735 A1 | 5/2011 | Petrou |
| 2011/0128288 A1 | 6/2011 | Petrou et al. |
| 2011/0131160 A1 | 6/2011 | Canny et al. |
| 2011/0131235 A1 | 6/2011 | Petrou et al. |
| 2011/0137895 A1 | 6/2011 | Petrou et al. |
| 2011/0145692 A1 | 6/2011 | Noyes et al. |
| 2011/0191676 A1 | 8/2011 | Guttman et al. |
| 2011/0225152 A1* | 9/2011 | Beaudreau ........ G06F 17/30867 |
| | | 707/728 |
| 2011/0238768 A1 | 9/2011 | Habets et al. |
| 2011/0246471 A1 | 10/2011 | Rakib |
| 2011/0258049 A1 | 10/2011 | Ramer et al. |
| 2011/0275358 A1 | 11/2011 | Faenger |
| 2011/0283296 A1 | 11/2011 | Chun |
| 2011/0307478 A1 | 12/2011 | Pinckney et al. |
| 2011/0307483 A1 | 12/2011 | Radlinksi et al. |
| 2012/0044137 A1 | 2/2012 | Oddiraju et al. |
| 2012/0083294 A1 | 4/2012 | Bray et al. |
| 2012/0092286 A1 | 4/2012 | O'Prey et al. |
| 2012/0117058 A1 | 5/2012 | Rubinstein et al. |
| 2012/0158751 A1* | 6/2012 | Tseng .................... G06Q 30/02 |
| | | 707/751 |
| 2012/0159340 A1 | 6/2012 | Bae et al. |
| 2012/0191840 A1 | 7/2012 | Gordon |
| 2012/0194519 A1 | 8/2012 | Bissell et al. |
| 2012/0216102 A1 | 8/2012 | Malla |
| 2013/0080447 A1 | 3/2013 | Ramer et al. |
| 2013/0091463 A1 | 4/2013 | Nordstrom et al. |
| 2013/0097507 A1 | 4/2013 | Prewett |
| 2013/0108161 A1 | 5/2013 | Carr |
| 2013/0111328 A1 | 5/2013 | Khanna et al. |
| 2013/0117252 A1 | 5/2013 | Samaddar et al. |
| 2013/0173604 A1* | 7/2013 | Li ..................... G06F 17/30864 |
| | | 707/723 |
| 2013/0254217 A1 | 9/2013 | Xu |
| 2013/0263098 A1 | 10/2013 | Duda et al. |
| 2013/0290110 A1 | 10/2013 | Luvogt et al. |
| 2013/0325844 A1* | 12/2013 | Plaisant ................ G06F 3/0482 |
| | | 707/722 |
| 2013/0346431 A1 | 12/2013 | Erol et al. |
| 2014/0029810 A1 | 1/2014 | Barr et al. |
| 2014/0040272 A1 | 2/2014 | Houghton |
| 2014/0046965 A1 | 2/2014 | Tian et al. |
| 2014/0082670 A1 | 3/2014 | Papish |
| 2014/0089626 A1 | 3/2014 | Schluessler et al. |
| 2014/0118597 A1 | 5/2014 | Tabak et al. |
| 2014/0142922 A1 | 5/2014 | Liang et al. |
| 2014/0146200 A1 | 5/2014 | Scott et al. |
| 2014/0152655 A1 | 6/2014 | Johnston et al. |
| 2014/0157210 A1 | 6/2014 | Katz et al. |
| 2014/0164371 A1 | 6/2014 | Tesch et al. |
| 2014/0188889 A1 | 7/2014 | Martens et al. |
| 2014/0208234 A1 | 7/2014 | Amit et al. |
| 2014/0250147 A1 | 9/2014 | Shapira et al. |
| 2014/0279013 A1 | 9/2014 | Chelly et al. |
| 2014/0282660 A1 | 9/2014 | Oztaskent et al. |
| 2014/0316890 A1 | 10/2014 | Kagan |
| 2014/0362108 A1 | 12/2014 | Aguera-Arcas |
| 2014/0366158 A1 | 12/2014 | Han et al. |
| 2015/0016700 A1 | 1/2015 | Drozdzal et al. |
| 2015/0019997 A1 | 1/2015 | Kim et al. |
| 2015/0095855 A1* | 4/2015 | Bai ......................... G06F 3/017 |
| | | 715/863 |
| 2015/0100524 A1 | 4/2015 | Pantel et al. |
| 2015/0169701 A1 | 6/2015 | Stekkelpak et al. |
| 2015/0178786 A1 | 6/2015 | Claessens |
| 2015/0212695 A1 | 7/2015 | Nordstrom et al. |
| 2015/0339405 A1 | 11/2015 | Vora et al. |
| 2016/0321052 A1 | 11/2016 | Sharifi et al. |
| 2017/0098159 A1 | 4/2017 | Sharifi et al. |
| 2017/0118576 A1 | 4/2017 | Sharifi et al. |
| 2017/0139879 A1 | 5/2017 | Sharifi et al. |

FOREIGN PATENT DOCUMENTS

| | | |
|---|---|---|
| CN | 101587495 A | 11/2009 |
| CN | 101763357 A | 6/2010 |
| EP | 2306290 A2 | 4/2011 |
| EP | 2466921 A2 | 6/2012 |
| EP | 2728481 A1 | 5/2014 |

(56) References Cited

FOREIGN PATENT DOCUMENTS

| EP | 2824558 A1 | 1/2015 |
|---|---|---|
| WO | 03088080 A1 | 10/2003 |
| WO | 2009054619 A2 | 4/2009 |
| WO | 2012075315 A1 | 6/2012 |
| WO | 2013173940 A1 | 11/2013 |
| WO | 2014105922 A1 | 7/2014 |
| WO | 2014146265 A1 | 9/2014 |

OTHER PUBLICATIONS

U.S. Appl. No. 14/724,965, filed May 29, 2015, 54 pages.
U.S. Appl. No. 14/872,582, filed Oct. 1, 2015, 43 pages.
U.S. Appl. No. 14/945,348, filed Nov. 18, 2015, 47 pages.
International Search Report and Written Opinion received for the PCT Patent Application No. PCT/US2015/046268, dated Nov. 26, 2015, 10 pages.
Hsu et al. "Snap2Read: Automatic Magazine Capturing and Analysis for Adaptive Mobile Reading", Lecture Notes in Computer Science, vol. 6524, 2011, 11 pages.
Adistambha et al., "Efficient Multimedia Query-by-Content from Mobile Devices", Computers & Electrical Engineering, vol. 36, Issue 4, Jul. 2010, pp. 626-642.
Non-Final Office Action for U.S. Appl. No. 14/451,396, dated Jul. 1, 2016, 7 pages.
Non-Final Office Action for U.S. Appl. No. 14/724,965, dated Sep. 16, 2016, 15 pages.
Non-Final Office Action received for U.S. Appl. No. 14/451,393, dated May 25, 2016, 26 pages.
Non-Final Office Action received for U.S. Appl. No. 14/451,389, dated Jul. 1, 2016, 11 pages.
Non-Final Office Action received for U.S. Appl. No. 14/451,385, dated Jul. 1, 2016,12 pages.
International Search Report and Written Opinion for PCT Application No. PCT/US2016/055055, dated Dec. 5 2016, 12 pages.
Collobert, et al., "Natural Language Processing (almost) from Scratch", Journal of Machine Learning Research, vol. 12, Aug. 1, 2011, pp. 2493-2537.
Minkov, et al., "Extracting Personal Names from Email: Applying Named Entity Recognition to Informal Text", Proceedings of Human Language Technology Conference and Conference on Empirical Methods in Natural Language Processing, retrieved from https://www.cs.cmu.edu/~rcwang/papers/emnlp-2005.pdf, Oct. 1, 2005, pp. 443-450.
"The new IFTTT is here", IFTTT Blog (https://ifttt.com/blog/2016/11/the-new-ifttt-is-here), printed Nov. 3, 2016, 6 pages.

* cited by examiner

PROVIDING AUTOMATIC ACTIONS FOR MOBILE ONSCREEN CONTENT

BACKGROUND

Use of mobile devices, such as smartphones and tablets, has been increasing. But navigating between applications in a mobile environment can be cumbersome, as mobile applications generally perform specific functions and do not conventionally interact. Furthermore, mobile applications can differ significantly in the features they provide and because of limited screen size and limited use of external input devices, navigation can be error prone and relatively time consuming.

SUMMARY

Implementations provide an interface that allows a user of a mobile device to quickly and easily perform various actions related to content the user is currently viewing on the mobile device. For example, the system may identify entities in a screen displayed on a mobile device and provide an interface for initiating actions for each entity, as well as surfacing snippets of information about the entities. The entities may include people, places, or things in a knowledge base, such as the knowledge graph, or may be contacts in a data store that is local to the mobile device or remote but associated with the user. The system may rank the entities to determine those most relevant to the user and generate an action card with suggested actions for the most relevant ranked entities. The actions offered in the action card and any information displayed in the action card for an entity may depend on search results for the entity.

According to certain aspects of the disclosure, a method includes performing recognition on content captured from a display of a mobile device, identifying a plurality of entities in the content, and issuing a respective query for each of the plurality of entities. The method also includes ranking the plurality of entities based on search results returned for the respective queries, generating a respective action card for at least some of the highest ranked entities, and providing the action cards for display to a user of the mobile device.

According to another aspect, a system comprises at least one processor; an indexed document corpus, a graph-based data store, and memory storing instructions that, when executed by the at least one processor cause the system to perform operations. The operations may include performing recognition on content captured from a display of a mobile device and identifying a plurality of entities in the content. For each of the plurality of entities, the operations may also include issuing a respective query to a search engine for the entity, the search engine searching the graph-based data store and the indexed document corpus to generate search results for the entity. The operations may further include ranking the plurality entities based on the search results and providing the plurality of entities with respective rank and search results to the mobile device, the mobile device generating action cards for at least some of the highest ranked entities generated using the respective search results.

In another aspect, a system comprises a contacts data store, at least one processor, and memory storing instructions that, when executed by the at least one processor, cause the system to perform operations. The operations may include performing recognition on content displayed on a display of a mobile device, identifying an entity in the content, and determining at least one contact in the contacts data store that corresponds to the entity. The operations may also include generating an action card for the entity, the action card having a first action that uses first information from the contacts data store for the contact and a second action that uses second information from the contacts data store for the contact, and displaying the action card on the display.

In another aspect, a computer program product embodied on a computer-readable storage device includes instructions that, when executed by at least one processor formed in a substrate, cause a computing device to perform any of the disclosed methods, operations, or processes disclosed herein.

One or more of the implementations of the subject matter described herein can be implemented so as to realize one or more of the following advantages. As one example, implementations may provide an interface with actions useful to the user that can be initiated without having to navigate through various applications and screens in a mobile environment. Thus, the actions may be considered automatic. Implementations are able to provide the interface regardless of the underlying application, e.g. across arbitrary interfaces, providing the ability to access the same functionality across all mobile applications running on the device. Implementations provide the suggested actions for entities likely to be of interest to the user based on the underlying content. The actions are useful because they are relevant to underlying context of the content. In other words, the suggested actions are appropriate for and based on the type of content. For example, a review action is appropriate for a movie or restaurant but not for a person. Similarly a call action is appropriate for a person but not a movie. The actions may represent a deep link to a particular mobile application, saving the user time and frustration by reducing the quantity of user input movements and reducing the potential for typographical errors in accomplishing the action. In some cases, the information displayed on the action card may eliminate the need for the user to navigate to another application to look up the information.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
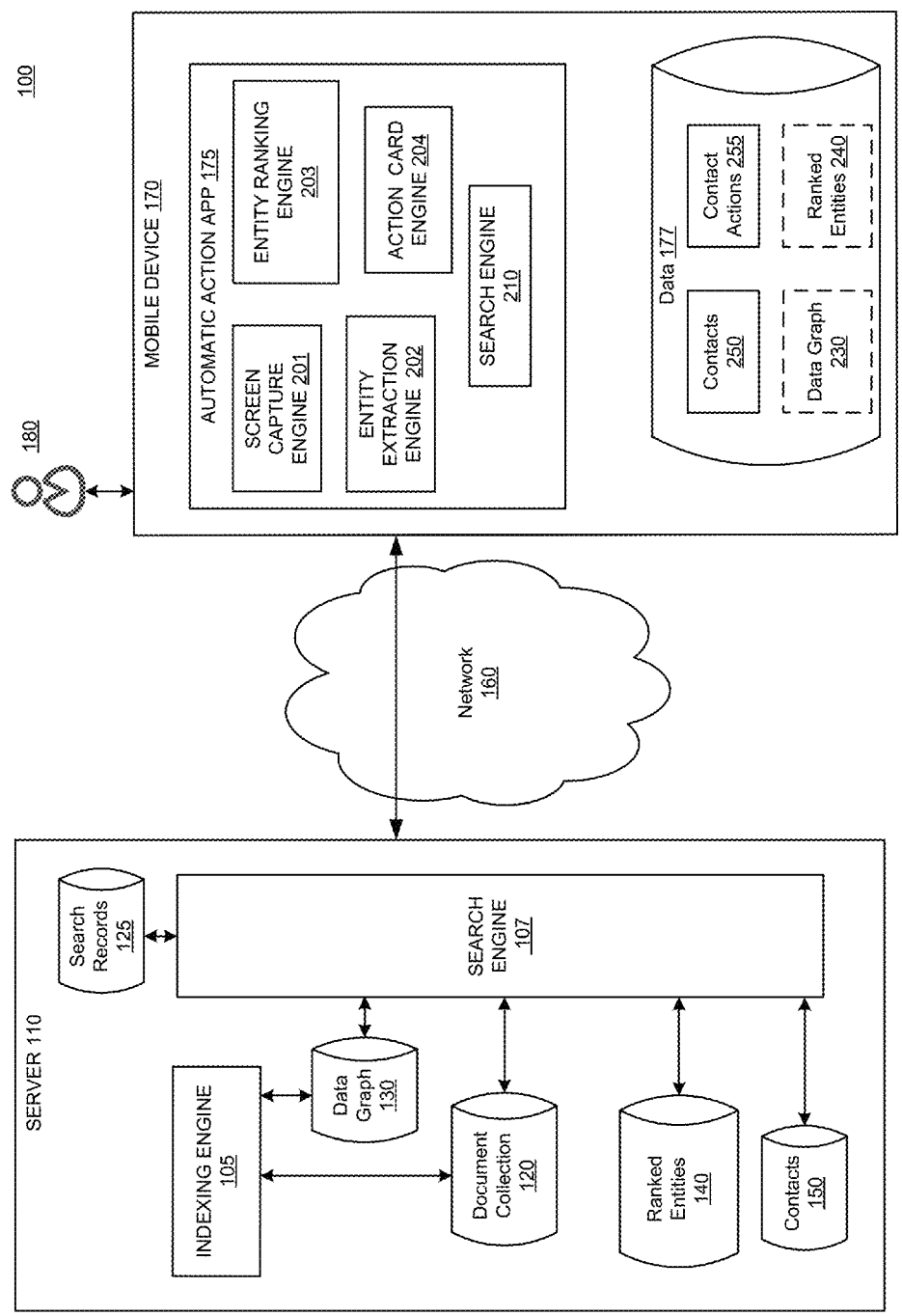
FIG. 1 is a block diagram illustrating an example system in accordance with the disclosed subject matter.

FIG. 1 is a block diagram of a mobile action suggestion system in accordance with an example implementation. The system 100 may be used to provide suggested actions for entities identified in the content of a screen displayed on a mobile device. An entity may be may be a person, place, item, idea, topic, word, phrase, abstract concept, concrete element, other suitable thing, or any combination of these. The depiction of system 100 in FIG. 1 is a client-server system, with some data processing occurring at a server 110. However, other configurations and applications may be used. For example, in some implementations, the system 100 may include mobile device 170 only, and all data processing may occur exclusively on the mobile device 170. In some implementations, most of the processing may be done on the mobile device 170 and server 110 may be used to provide information, e.g. via the search engine 107. In some implementations, a user of the mobile device 170 may indicate that portions of the processing be performed at the server 110. For example, a user may provide the location of a contacts data store on one or more remote servers that can be accessed by the mobile device 170 to identify contact entities. Thus, implementations are not limited to the exact configurations illustrated in FIG. 1.

Figure 7:
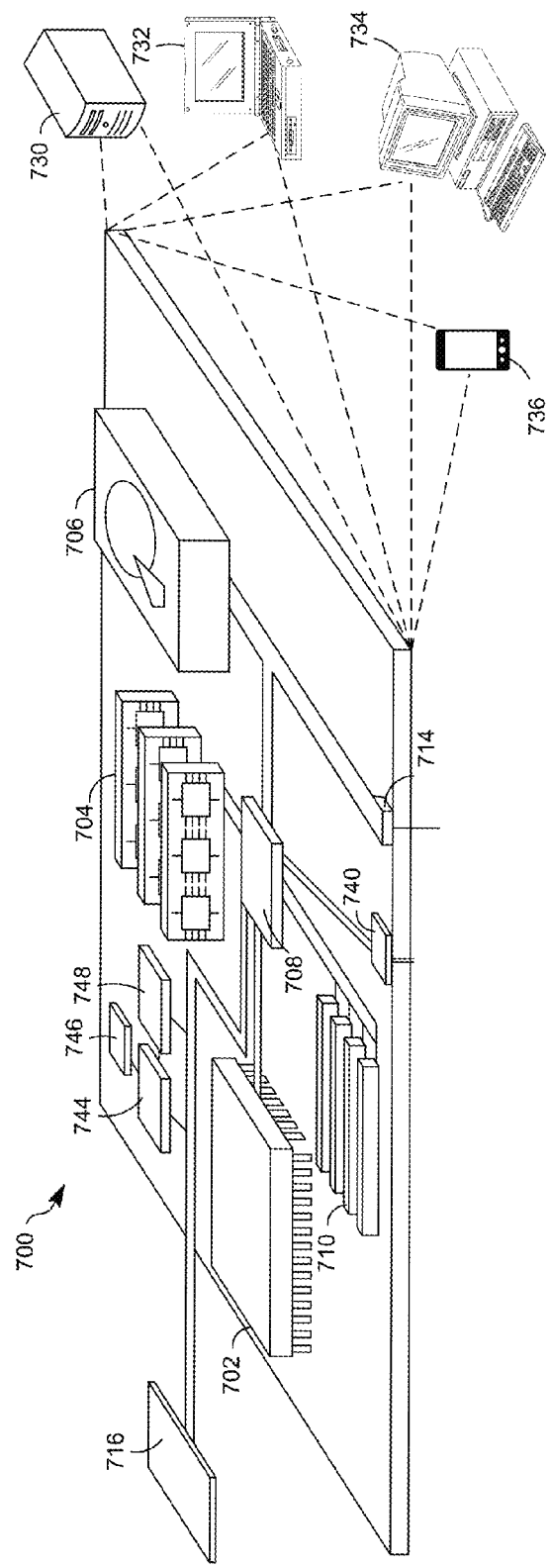
FIG. 7 shows an example of a computer device that can be used to implement the described techniques.

The mobile action suggestion system 100 may include mobile device 170. Mobile device 170 may be any mobile personal computing device, such as a smartphone or other handheld computing device, a tablet, a wearable computing device, etc., that operates in a closed mobile environment rather than a conventional open web-based environment. Mobile device 170 may be an example of computer device 700, as depicted in FIG. 7. Mobile device 170 may include one or more processors formed in a substrate configured to execute one or more machine executable instructions or pieces of software, firmware, or a combination thereof. The mobile device 170 may include an operating system (not shown) and one or more computer memories configured to store one or more pieces of data, either temporarily, permanently, semi-permanently, or a combination thereof. The mobile device 170 may thus include mobile applications, including automatic action application 175, which represent machine executable instructions in the form of software, firmware, or a combination thereof. Conventionally, mobile applications operate in a closed environment, meaning that the user employs separate applications to perform activities conventionally performed in a web-based browser environment. For example, rather than going to hotels.com to book a hotel or opentable.com to make a reservation, a user of the mobile device 170 can use a mobile application provided by hotels.com or opentable.com respectively. While automatic action application 175 is illustrated as a mobile application running on the mobile device 170, it is understood that one or more of the components identified in the automatic action application 175 may be part of the operating system. In some implementations, all components of automatic action application 175 may be part of the operating system. In some implementations, one or more of the components of automatic action application 175 may be performed at the server 110.

The automatic action application 175 may include screen capture engine 201. The screen capture engine 201 may be configured to capture the current screen (e.g. by copying or reading the contents of the device's frame buffer). The screen capture engine 201 may capture the current screen at intervals or upon a command by the user 180 of the mobile device 170. For example, the user may perform an action, such as a swipe up, a swipe down, a diagonal swipe, a two-finger swipe, etc., that initiates the screen capture engine 201 and the automatic action application 175. Alternatively, the screen capture engine 201 may capture the screen at some interval, perhaps a small interval, such as every half second or every second, and the user action may initiate the automatic action application 175, via the action, using the most recently captured screen. In some implementations, the screen capture engine 201 may capture the screen by copying accessibility data generated for the screen. For example, the operating system of some mobile devices 170 may generate a text file that describes the current screen, for example to assist people with a visual impairment. In some implementations, the screen capture engine 201 may use this text file in addition to or instead of the information from the frame buffer in capturing the current screen. Thus, reference to a screen capture image, a captured screen, or screen content is understood to include the content of a frame buffer, the content in an accessibility file, or both. In some implementations, the screen may be a screen previously captured on the mobile device. For example, the mobile device may include an agent that, with user permission, captures the current screen at intervals and indexes the content of the screen so that the user can search for a previously captured screen. One of the actions that a user could perform on a previously captured screen is generation of actions for entities identified in the screen.

The screen capture engine 201 may provide the captured screen content and metadata to the entity extraction engine 202. The metadata may include the timestamp, the mobile device type, a location of the mobile device, a mobile device identifier, the mobile application running when the screen was captured, or in other words the application that generated the screen, and other device information, such as which applications were active, ambient light, motion of the device, etc. The metadata may assist in content analysis (e.g., entity disambiguation) and deciding what content is most relevant.

The entity extraction engine 202 may include one or more recognition engines. The recognition engine may be configured to perform various types of recognition on the captured screen, including character recognition, image recognition, logo recognition, etc., using conventional or later developed techniques. Thus, entity extraction engine 202 may be configured to determine text, landmarks, logos, etc. from the captured screen, as well as the location of these items in the screen.

Using the text, landmarks, logos, etc. recognized in the captured screen, the entity extraction engine 202 may identify entities. Entity identification involves several techniques, including part-of-speech tagging, dependency parsing, noun-phrase extraction, and coreference resolution. Part-of-speech tagging identifies the part of speech that each word in the text of the document belongs to. Dependency parsing identifies the relationships between the parts-of-speech. Noun-phrase extraction identifies, or segments, noun phrases such as the phrases "Barack Obama," "Secretary Clinton," or "First Lady." In other words, noun-phrase extraction aims to identify potential mentions of entities, including the words used to describe them. Coreference resolution aims to match a pronoun or pronominal to a noun phrase. The entity extraction engine 202 may use any conventional techniques for part-of-speech tagging, dependency parsing, noun-phrase extraction, and coreference resolution.

The entity extraction engine 202 may also use conventional name identification techniques, such as a name classifier, to identify text that is possibly a name. Such text may be considered an entity. The entity extraction engine 202 may send the possible names to one or more contacts data stores to see if any entries match the name. For example, the search engine 210 may be used to search the contacts data store 250 and/or remote contact data stores that the user 180 identifies, such as contacts 150, for contacts that match the possible name. The contacts data store may be an address book, social media contacts, email contacts, mailing list, etc., and may be stored locally on the mobile device, such as contacts 250, or may be remote, for example contacts 150.

The entity extraction engine 202 may optionally attempt to match entities in the screen content to entities in a data graph, such as data graph 130 or data graph 230 or both. A single entity in the screen content may match more than one entity in the data graph. For example, the text "Jaguar" in the screen content may match three entities in the data graph: one representing an animal, one representing an NFL team, and the third representing a car. In some implementations, the entity extraction engine 202 may use entity disambiguation to select one of the entities in the data graph as the entity mentioned in the screen content, using conventional or later discovered techniques. It is understood that entities may be associated with text or with images and logos. For example, a picture of Big Ben may be associated with an entity representing Big Ben in the data graph. Similarly, a picture of President Obama may be associated with an entity representing Barack Obama in the data graph. Thus, the entity extraction engine 202 may identify entities in images as well as text.

The entity extraction engine 202 may issue a query for the entities identified in the screen content. In some implementations, the entity extraction engine 202 may issue the query to a search engine, such as search engine 107. The search engine 107 may generate a search result and may provide other information about the query, as will be discussed in more detail below. In some implementations, the automatic action application 175 may include a search engine 210 that searches a locally-stored data graph 230 and/or contacts 250. The search engine 210 may also search a remotely located contacts data store, such as contacts 150. The search engine 210 may return query results that include information from the contacts data store(s) and search results similar to those provided by search engine 107.

The automatic action application 175 may also include an entity ranking engine 203. The entity ranking engine may, based on the search results, rank the identified entities based on the query results, information about the query, and the source of the search results and select entities for action cards. For example, entities found in a contacts data store may automatically receive a high ranking The entity ranking engine 203 may select highest ranked entities for action cards. In some implementations, the entity ranking engine 203 may use entities associated with a user profile, such as ranked entities 240, to determine which entities are highest ranked. The ranked entities 240 may include an indication of how relevant an entity is to the user, for example based on a user provided profile or, with user permission, how often the entity is identified in content the user browses.

The action card engine 204 may generate the action card for each selected entity. The action card includes one or more actions that a user can select for the entity. The actions are based on the search results for the entity. For example, entities found in a contacts data store may have actions such as call, message, email, show information, etc. The actions may be default actions determined by mobile device 170 or may be actions selected by the user 180 and stored, for example, in contact actions 255. Thus, a user may be able to customize the suggestions actions shown for an entity found in a contacts data store. Entities in the data graph may have actions that are based on the search results. For example, actions may be extracted from a knowledge panel or from links and data provided as conventional search results, as will be explained in more detail herein. The action card engine 204 may also arrange the cards in an order based on the type of entity and its rank, as will be explained in more detail herein.

The entity extraction engine 202 may operate on the mobile device 170 or a server, such as server 110, or both. For example, the entity extraction engine 202 may have one or more components on the mobile device 170 that look for possible names in the content and looks for those entities in a contacts data store and may have one or more components on the server 110 that recognize entities in images and text and attempt to match these entities to entities in a data graph. As another example, the screen capture engine 201 may send the screen content to a server 110, where the content is analyzed by the recognition engine and the recognition engine may send identified entities to the mobile device 170 for further processing. In some implementations, the server 110 may continue with entity identification and ranking, sending the search results, rank, or action cards to the mobile device 170 for further processing. Of course, in some implementations the entity extraction engine 202 may reside solely on the mobile device 170.

The mobile device 170 may also include data 177, which is stored in the memory of the mobile device 170 and used by the mobile applications, including the operating system and automatic action application 175. When stored in data 177 on the mobile device 170, the data graph 230 may be a subset of entities and relationships in data graph 130 of FIG. 1, especially if data graph 130 includes millions of entities and billions of relationships. For example, the entities and relationships in data graph 230 may represent the most popular entities and relationships from data graph 130, or may be selected based on user preferences. For example, if the user has a profile, entities and relationships may be selected for inclusion in data graph 230 based on the profile. The contact actions 255 may represent actions that the user selects for contacts found in a contacts data store, such as contacts 250 and contacts 150. The actions may be based on the information stored in the contacts data store. For example, the actions may include calling the home phone number of a contact, calling the mobile phone number of a contact, mapping the contact's address, sending the contact an email, sending the contact a text message, viewing the contact's information, opening a page for the contact on a social media site or in a social media mobile application, etc. Thus, by selecting the contact actions the user can customize the actions on the action card. In some implementations, the contact actions 255 may be stored in a location accessible by multiple computing devices so, for example, the user 180 can have the same default actions across multiple mobile computing devices. The contacts data store 250 may represent any type of data store used to store information for people or businesses that the user 180 knows. For example, the contacts data store 250 may be one or more of an address book, contacts from a calendar or mail application, contacts from a social media site, contacts from a mailing list, etc.

Figure 8:
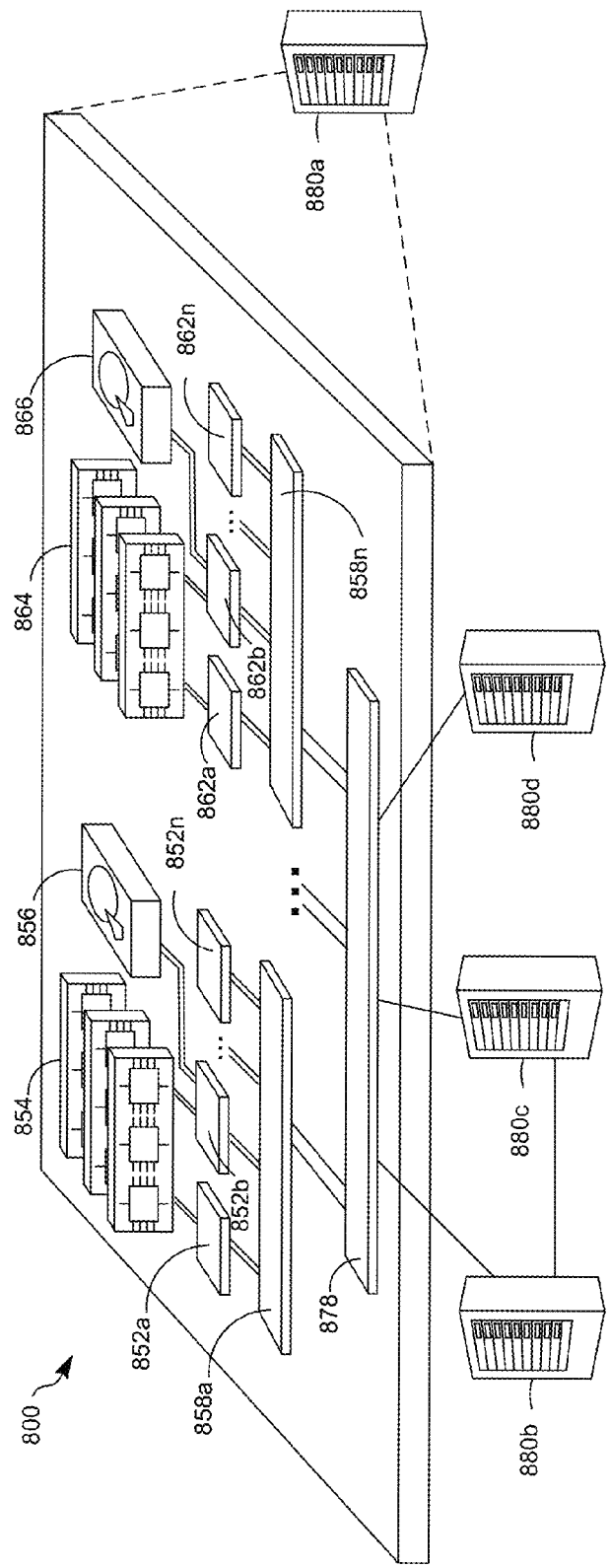
FIG. 8 shows an example of a distributed computer device that can be used to implement the described techniques.

The mobile action suggestion system 100 may include a server 110, which may be a computing device or devices that take the form of a number of different devices, for example a standard server, a group of such servers, or a rack server system. For example, server 110 may be implemented in a distributed manner across multiple computing devices. In addition, server 110 may be implemented in a personal computer, for example a laptop computer. The server 110 may be an example of computer device 700, as depicted in FIG. 7, or computer device 800, as depicted in FIG. 8. Server 110 may include one or more processors formed in a substrate configured to execute one or more machine executable instructions or pieces of software, firmware, or a combination thereof. The server 110 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules that, when executed by the one or more processors, perform certain operations. In some implementations, the modules may be stored in an external storage device and loaded into the memory of server 110.

The mobile action suggestion system 100 may include a data graph 130. The data graph 130 may be a large graph-based data store that stores data and rules that describe knowledge about the data in a form that provides for deductive reasoning. For example, in a data graph, information may be stored about entities in the form of relationships to other entities and properties or attributes about an entity. An entity, by way of non-limiting example, may include a person, place, item, idea, topic, word, phrase, abstract concept, concrete element, other suitable thing, or any combination of these. Entities may be related to each other by labeled edges that represent relationships. The labeled edges may be directed or undirected. For example, the entity representing the National Football League may be related to a Jaguar entity by a "has team" relationship. A data graph with a large number of entities and even a limited number of relationships may have billions of connections. In some implementations, data graph 130 may be stored in an external storage device accessible from server 110 and/or mobile device 170. In some implementations, the data graph 130 may be distributed across multiple storage devices and/or multiple computing devices, for example multiple servers. The entities, attributes, and relationships in the data graph 130 may be searchable, e.g., via an index. For example, the index may include text by which an entity has been referred to. Thus, reference to the data graph 130 may be understood to include an index that facilitates finding an entity using a text equivalent.

The mobile action suggestion system 100 may include document collection 120. Document collection 120 may include an index for searching for terms or phrases within a corpus of documents. In some implementations the corpus may be documents available on the Internet. Documents may include any type of file that stores content, such as sound files, video files, text documents, source code, news articles, blogs, web pages, PDF documents, spreadsheets, etc. In some implementations, document collection 120 may store one-dimensional posting lists that include phrases, terms, or document properties as posting list values and, for each posting list value, identifiers for documents related to the phrase, term, or property. While an index for crawled documents 120 has been described as using posting lists, the index may have some other known or later developed format.

The system 100 may also include search records 125. Search records 125 may include search logs, aggregated data gathered from queries, or other data regarding the date/time and search terms of previously processed queries. In some implementations, the search records 125 may be generated by search engine 107 in the normal process of generating search results. The data graph 130, document collection 120, and search records 125 are stored on tangible computer-readable storage devices, for instance disk, flash, cache memory, or a combination of these, configured to store data in a semi-permanent or non-transient form. In some implementations data graph 130, document collection 120, and search records 125 may be stored in a combination of various memories and/or may be distributed across multiple computing devices.

In some implementations, the system 100 may include an indexing engine 105 that includes one or more processors configured to execute one or more machine executable instructions or pieces of software, firmware, or a combination thereof to create and maintain data graph 130 and/or document collection 120, etc. The indexing engine may obtain content from, for example, one or more servers, and use the content to maintain data graph 130 and/or document collection 120. In some implementations, the servers may be web servers, servers on a private network, or other document sources that are accessible by the indexing engine. The indexing engine may be one or more separate computing devices, such that data graph 130 is maintained by a first set of computing devices and document collection 120 is maintained by a second set of computing devices, etc.

The server 110 may include a search engine 107. The search engine 107 may include one or more computing devices that use the data graph 130 and/or document collection 120 to determine search results for queries, for example, using conventional or other information retrieval techniques. Search engine 107 may include one or more servers that receive queries from a requestor, such as mobile device 170, and provide search results to the requestor. For example, the search engine 107 may receive a query from the automatic action application 175, or a component of the automatic action application 175, such as the entity extraction engine 202. The query may include the text reference for an entity, text that describes the entity, an entity identifier, etc. The query may also include metadata, such as a location of the mobile device, that can help the search engine 107 generate query results. Search results may include information from documents responsive to the query, information (e.g., facts) from relationships and entities in the data graph 130, and/or informational properties about the query (e.g., popularity, frequency, most frequently selected search result, etc.) from search records. As discussed above, the data graph 130 may connect entities by edges that represent relationships and include attributes or properties of an entity.

When the search engine 107 queries the data graph 130 the search results may include a knowledge panel. A knowledge panel generally includes the most common information requested about a particular entity based on the entity type and the relationships in the data graph. The knowledge panel may include a brief description of the entity and attributes and relationships for the entity. For example, a knowledge panel for entities representing locations may include a phone number and address and possibly a rating, pictures, a website, a link to an encyclopedia or wiki page describing the entity, etc. A knowledge panel for entities representing people may include biographical information, movies they have acted in, pictures, etc. The search result may also include information from a document collection, for example in the form of a link to a web page and a snippet describing the web page or its contents. Thus, the search results generated by the search engine 107 may include results from a search of the data graph 130 and/or a search of the document collection 120 in response to the query. The search engine 107 may also provide metadata about the query, such as its popularity, to the automatic action application 175.

The mobile action suggestion system 100 may include data stores associated with a user account or profile. The data stores are illustrated in FIG. 1 as residing on server 110, but one or more of the data stores may reside on the mobile device 170 or in another location specified by the user. The data stores may include the ranked entities 140 and contacts 150. The data stores may be stored on any non-transitory memory. The ranked entities 140 may include an indication of how relevant an entity is to the user.

The mobile device 170 may be in communication with the server 110 and with other mobile devices over network 160. Network 160 may be for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160, the server 110 may communicate with and transmit data to/from mobile device 170 and the mobile device 170 may communicate with the server 110.

The mobile action suggestion system 100 represents one example configuration and implementations may incorporate other configurations. For example, some implementations may combine one or more of the components of the screen capture engine 201, the entity extraction engine 202, the entity ranking engine 203, the action card engine 204, and the search engine 210 into a single module or engine, and one or more of the components of the automatic action application 175 may be performed by a server, such as server 110. As another example one or more of the data stores, such as data graph 130, contacts 150, ranked entities 140, contacts 250, contact actions 255, data graph 230, and ranked entities 240 may be combined into a single data store or may distributed across multiple computing devices, or may be stored at the server. Although only one server 110 is illustrated, it is understood that the mobile action suggestion system 100 may include multiple servers and that components illustrated as part of server 110 may be distributed across different servers. For example, the contacts data store 150 and the ranked entities 140 data store may be on a different server than the document collection 120 and the data graph 130. As another example, the data graph 130 and/or document collection 120 may be distributed across multiple servers.

To the extent that the mobile action suggestion system 100 collects and stores user-specific data or may make use of personal information, the users may be provided with an opportunity to control whether programs or features collect the user information (e.g., information about a user's social network, social actions or activities, user input actions, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a mobile action suggestion system.

In order to provide personalized assistance in a mobile application environment, disclosed implementations may identify, with user consent, entities displayed on the screen of a mobile device. The system may use search results to rank the entities and provide suggested actions and other information on actions cards for the highest ranked entities. The suggested actions may be based on the search results.

Figure 2:
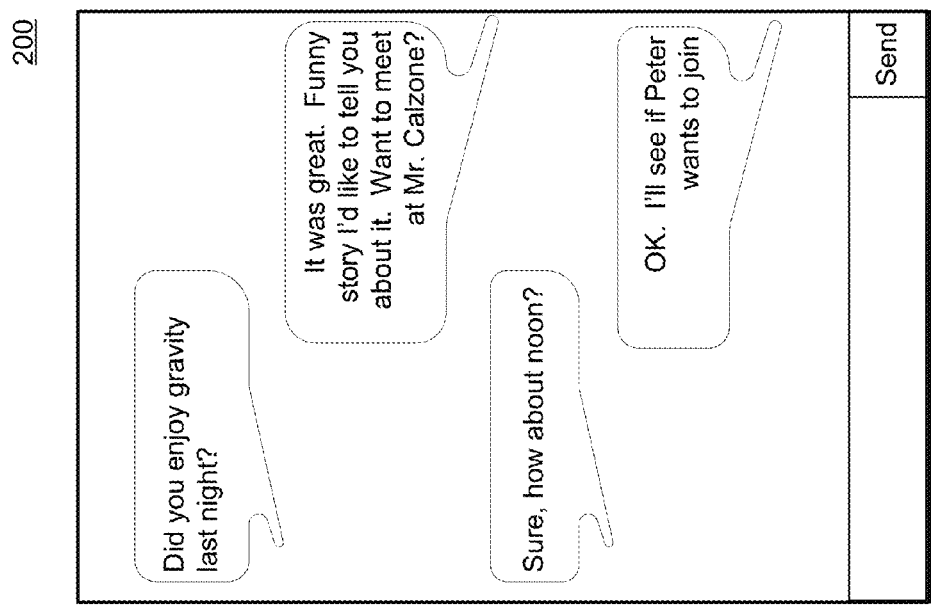
FIG. 2 illustrates an example display of a mobile computing device.

FIG. 2 illustrates an example display 200 of a mobile computing device. In the example of FIG. 2, the display is generated by a mobile application that allows one user to send and receive text messages to one or more other users. Of course, implementations are not limited to the mobile application illustrated in FIG. 2. Any content from any mobile application may serve as the basis for automatic action suggestions.

Figure 3:
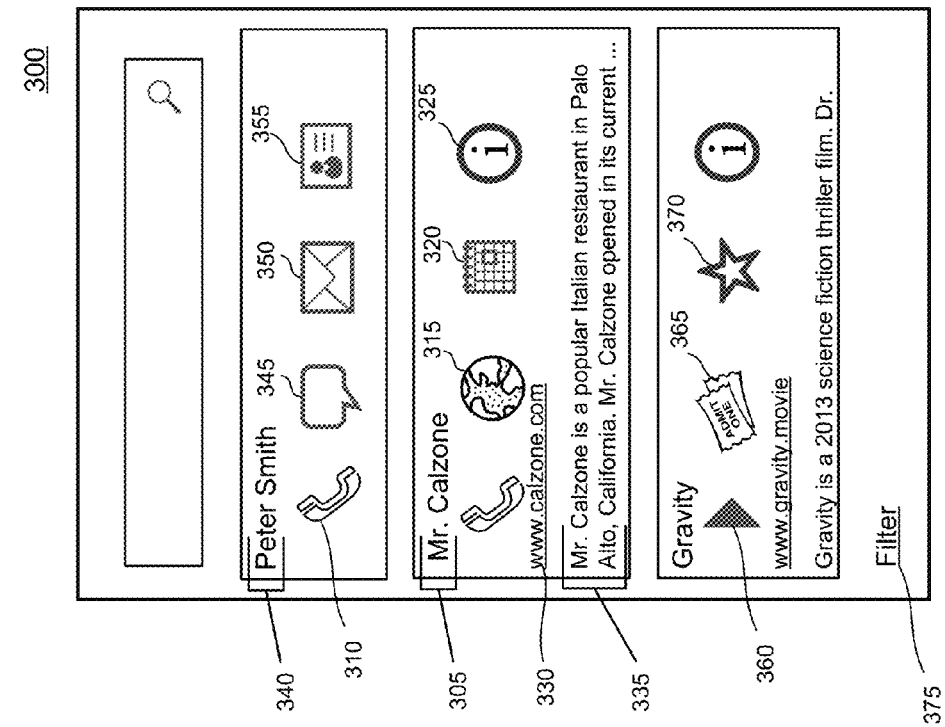
FIG. 3 illustrates an example user interface providing suggested actions generated based on the display of FIG. 2.

FIG. 3 illustrates an example user interface 300 providing suggested actions generated for entities identified in the display 200 of FIG. 2. In the example of FIG. 3, the display 300 illustrates three action cards, one for each of three entities identified from the content of display 200. The first action card is for the entity Peter Smith, as illustrated by the label 340. Peter Smith is a contact in a contacts data store associated with the user of the mobile device. Action cards for entities found in a contacts data store may be listed in a position of prominence with regard to action cards for other entities. The action card for the Peter Smith entity of display 300 includes four suggested actions represented by four icons. The first action is a call action 310, represented by the telephone icon. If the user of the mobile device selects the call action 310, the mobile device may initiate a phone call from a phone application to the phone number associated with Peter Smith in the contacts data store. Similarly, the message action 345 may initiate a messaging application to the number or address listed in the contacts data store for Peter Smith, similar to the application illustrated in display 200. The mail action 350 may initiate an email application by opening a new message addressed to the email address for Peter Smith in the contacts data store. Selection of the information action 355 may open an application that displays the content of the entry in the contacts data store for Peter Smith. Other possible actions may be possible, depending on the information available in the contacts data store. For example, other actions may open a social media page for Peter Smith, open a map to the address for Peter Smith, initiate a video call to Peter Smith, etc. Thus, implementations are not limited to the actions illustrated in display 300. Furthermore, a user may customize the suggested actions, by selecting or ranking the possible actions for entities identified in a contacts data store. Although not illustrated in user interface 300, the action card may also include other information, such as a nickname for the contact, a picture of the contact, etc.

The second action card illustrated in the user interface 300 of FIG. 3 is for the restaurant Mr. Calzone, as illustrated by label 305. The label 305 may be based on a text description of the entity in a graph-based data store, such as data graph 130, or may be the text or image from the screen, e.g., display 200. The action card includes four default actions for the restaurant. The first is a call action represented by the phone icon. The second is a map action 315. The map action 315 may open a map mobile application to the address for the restaurant. The phone number and the address of the restaurant may be obtained, for example, from search results returned for a query related to the entity. The third action is a reservation action 320. For example, when the user selects the reservation action 320 the system may open a mobile application that allows the user to make a reservation at the restaurant. The system may open the mobile application with the restaurant already selected so that the user does not need to search for the restaurant. In this sense, the suggested action may be a deep link. If the user does not have a mobile application for making a reservation, the system may open a browser application to a website that allows the user to make the reservation. The fourth action is an information action 325. The information action 325 may open a wiki or encyclopedia page that relates to the restaurant or may open or display a knowledge panel for the restaurant. Of course other actions may be presented based on the search results as will be explained in more detail herein. The action card may also include other information or actions. For example, the action card may include a link 330 to the official website for the restaurant and/or a brief description 335 of the restaurant, which can be obtained from the search results.

The third action card illustrated in FIG. 3 is for the movie Gravity. This action card also includes four suggested actions. The first is a play movie action 360. This may be a link to the movie trailer, for example. The link may open a browser application to the movie trailer or may open a movie-related mobile application to the movie trailer. The second action is a ticket purchase action 365. Selection of the ticket purchase action 365 may open a mobile application or website that allows the user to purchase tickets to the movie at a local theatre. The third action is a ratings action 370. Selection of the ratings action 370 may open a mobile application with reviews for the movie, or may open a browser to a website that offers reviews of the movie. The fourth action is an information action, which may function similar to the information action 325 discussed above for the restaurant. The action card may also include additional information, such as a snippet describing the movie and a link to the official website for the movie, etc.

User interface 300 may be navigable. For example, although only three action cards are illustrated, a user may scroll the user interface 300 to reveal additional action cards for additional entities. Action cards for the highest ranked entities may appear on the initial screen, and action cards for other highly ranked entities may be accessible through navigation, for example scrolling or selecting on a 'next' link or icon. In some implementations, the user interface 300 may provide a mechanism for selecting the entities displayed in the action cards. For example, the user interface 300 may include filter control 375 that, when selected, opens a user interface that allows the user to select entity types. The control 375 may be a link, a button, a checkbox, or any other type of control. As an example, when the user selects control 375, the system may enable the user to elect to display action cards for contacts and places but not movies or restaurants, etc. The entity types selectable in the filter may be based on the entity types that have action cards in the underlying interface 300. As an example, if a user of user interface 300 selects a restaurant entity type using the filter, the user interface may display the second action card but may not display the first and the third action cards in the example of FIG. 3. If other action cards for other restaurants exist, the system may display those action cards instead. Thus, the user may interactively customize the user interface 300.

As illustrated, the user interface 300 provides the user of the mobile device with a shortcut for getting information about entities and performing additional actions for the entities. For example, if the user intends to call Peter to make lunch arrangements, rather than having to exit out of the messaging application, navigate to a telephone application, find Peter's phone number and initiate the call, with one swipe (e.g., swipe up, swipe down, diagonal swipe, etc.), the user can select the call action 310 to initiate the call. Thus, the user interface 300 offers faster and more efficient methods of accomplishing an action to the user.

Figure 4:
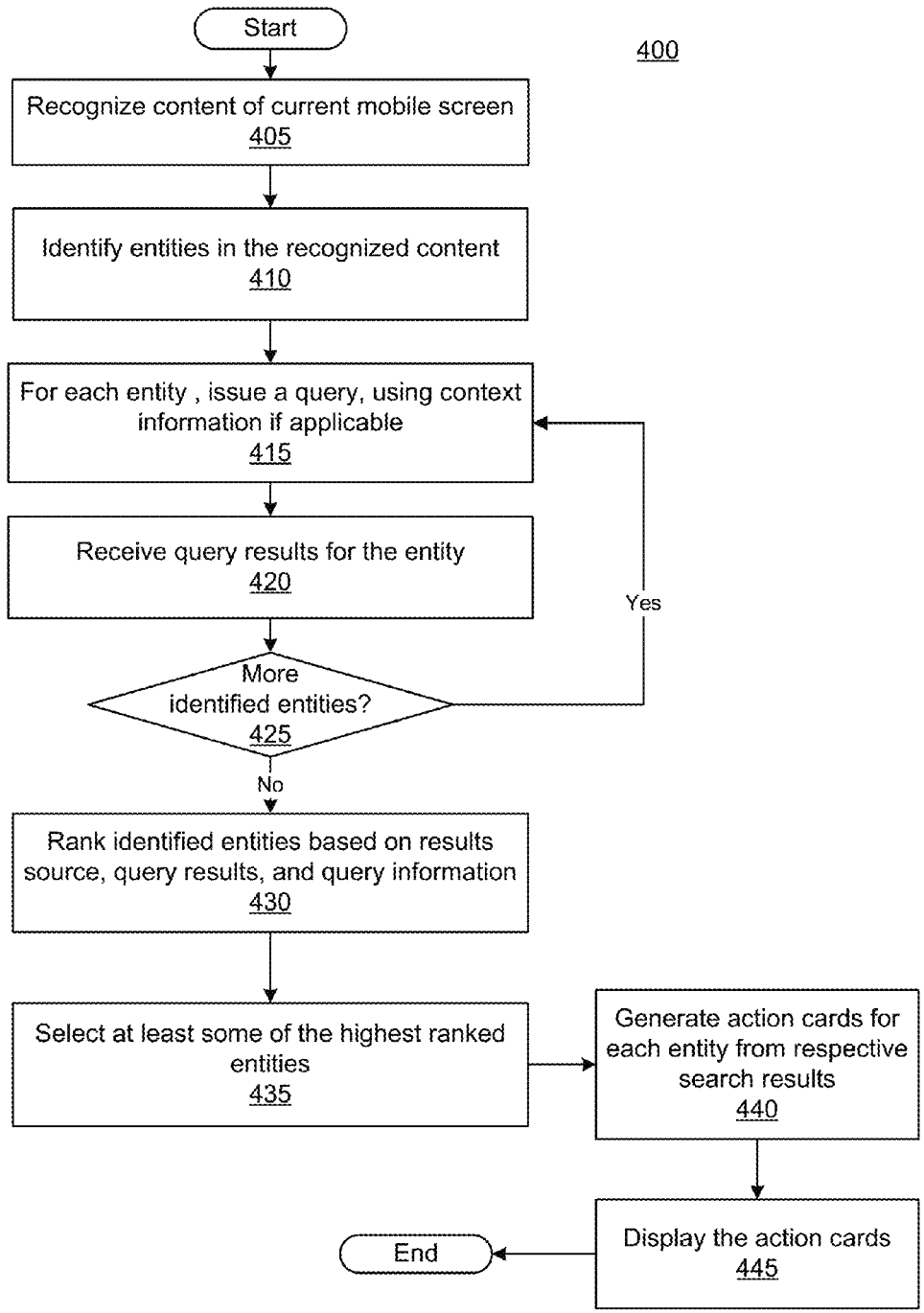
FIG. 4 illustrates a flow diagram of an example process for providing action cards for at least some entities identified in the content of a mobile screen, in accordance with disclosed implementations.

FIG. 4 illustrates a flow diagram of an example process 400 for providing action cards for at least some entities identified in the content of a mobile screen, in accordance with disclosed implementations. Process 400 may be performed by a mobile action suggestion system, such as system 100 of FIG. 1. Process 400 may be used to identify entities in the content of a display of a mobile device, rank the entities to determine those most relevant to the user, and to provide suggested actions and basic information for at least some of the entities. Process 400 may begin by receiving content of a screen on the mobile device and performing recognition on the content (405). The captured image may be obtained using conventional techniques, for example by copying or reading the frame buffer of the mobile device, and/or by copying or reading accessibility data generated for the current screen. The system may perform recognition on the content. Recognized items may be text characters or numbers, landmarks, logos, etc. located using various recognition techniques, including character recognition, image recognition, logo recognition, etc. Thus, recognized items may include words as well as locations, landmarks, logos, etc.

The system may find entities in the recognized content (410). For example, the system may perform part-of-speech tagging, dependency parsing, noun-phrase extraction, and coreference resolution using any conventional techniques for finding possible entities. In some implementations, the system may query a data graph to determine if the entity does actually correspond to one or more entities in the graph. The system may also use name classifiers or named entity recognition algorithms to identify entities. Of course, the system may also identify entities from image recognition or logo recognition. In some implementations, the system may keep only entities that may refer to a person (e.g., a possible person's name) or that correspond to an entity in the data graph for further processing. In other words, in such an implementation the system may discard entities that do not correspond to an entity in the data graph and are not likely a name.

Once the system has identified the entities in the screen content, the system may, for each entity, issue a query to a search engine (415). For an entity that may represent a person, the system may search directly, or send a query to, one or more contact data stores associated with the user. The query may look for the entity as the first name, last name, nickname, or a combination of these in the contacts data store. For example, the system may use an API to access the contacts data store. The system may also send the entity as a query to a search engine. The query may include context information, such as the location of the mobile device, to help the search engine deliver more relevant results. The search engine may process the query and the context information against multiple data sources. For example, the search engine may return results from a graph-based data store, such as data graph 130. In some implementations, the search result from the data graph may be a knowledge panel or information used to generate a knowledge panel. The knowledge panel may include commonly requested or viewed information for the entity from the data graph. The search engine may also search a document collection, such as documents available over the Internet. Such a collection may return links, each link being a link to a particular web site, to a particular document, etc., and a snippet or short description of the relevant content in the website or document.

The system may receive the query results for the entity (420). As indicated above, the query results may be information returned from a contact data store, a knowledge panel or information used to generate a knowledge panel, and conventional search results that include a link and a snippet of text about the document. If there are other entities that have not been queried (425, Yes), the system may repeat steps 415 and 420 for those entities. When the entities have all been queried and have corresponding search results (425, No), the system may rank the entities (430). The rank may depend on several factors, including the results source, the query results, and other query information. For example, entities found in a contacts data store may be considered highly relevant to the user of the mobile device and may receive a high rank. Such entities can also be referred to as contacts. The system may thus display action cards for contacts in a position of prominence with respect to action cards for non-contact entities. In some implementations, when multiple contacts are found in the contacts data store(s) the system may determine a frequency of interaction for each contact and rank the contacts based on the frequency, assigning contacts with higher frequency interactions a higher rank. Frequency of interactions may be based on chats, calls, emails, text messages, video-chats, etc. This information may be available on the mobile device and can be augmented, with user permission, by a user account. In some implementations, if the entity is a first name and two contacts share the first name, the system may choose the contact with more interactions over the one with fewer interactions. In some implementations if the number of interactions is close, the system may choose both contacts, so that the two entities may be selected for action cards. In some implementations, if the frequency of interactions does not meet a threshold the system may not give a high rank to the contact. In this scenario, the system may display action cards for lower ranked contacts after the action cards for highly ranked non-contact entities.

For entities that do not have search results from a contact data store, the system may use the query results and information about the query to rank the entities. For example, search results that include a knowledge panel may result in a boost in rank. As another example, query information indicates that the query is popular (e.g., is a frequent query subject) may boost the rank of the corresponding entity. Rank may also be based on where and how the entity appeared on the captured screen. For example, an entity that appears in large font (when compared with the rest of the screen) may receive a boost in rank, or an entity in a title or in all capital letters may receive a boost in rank. The rank of an entity based on screen location can be mobile application specific. For example, in most mobile applications entities appearing at the top of the screen may receive a boost in rank, but in a chat application entities mentioned at the bottom of the screen, where more recent messages occur, may receive a boost in rank. In addition, entities that have a much larger quantity of individual relevant documents may receive a boost in rank.

The system may select some of the entities to be the subject of action cards (435). In some implementations, a pre-determined number of highest ranked entities may be selected, for example three or four. In some implementations, all entities are selected if their rank meets a threshold. This may result in the generation of more action cards than will fit on the screen of the mobile device at one time, making the user interface navigable to see the additional, lower-ranked action cards. The system may generate an action card for each selected entity (440). The actions selected for the action card and any text snippets may be based on the search results, as explained in more detail with regard to FIG. 5. The system may display the action cards on the screen of the mobile device (445), as illustrated in the example of FIG. 3. The system may display the action cards according to their rank, so that action cards for higher ranked entities appear in a position of prominence with regard to action cards for lower ranked entities. In some implementations, all action cards for contacts may appear in a position of prominence with regard to action cards for non-contact entities. Process 400 then ends.

Displaying the user interface generated by process 400 may not terminate the underlying mobile application. In other words, the display of the suggested action user interface may be temporary, with the underlying application still running Thus, if the user does not select an action but closes the suggested action user interface the user may be returned to the screen displayed prior to generation of the suggested action user interface via process 400. However, selecting a suggested action from the user interface may cause the mobile device to switch to the application associated with the action, making the switched-to application the currently-running application.

Figure 5:
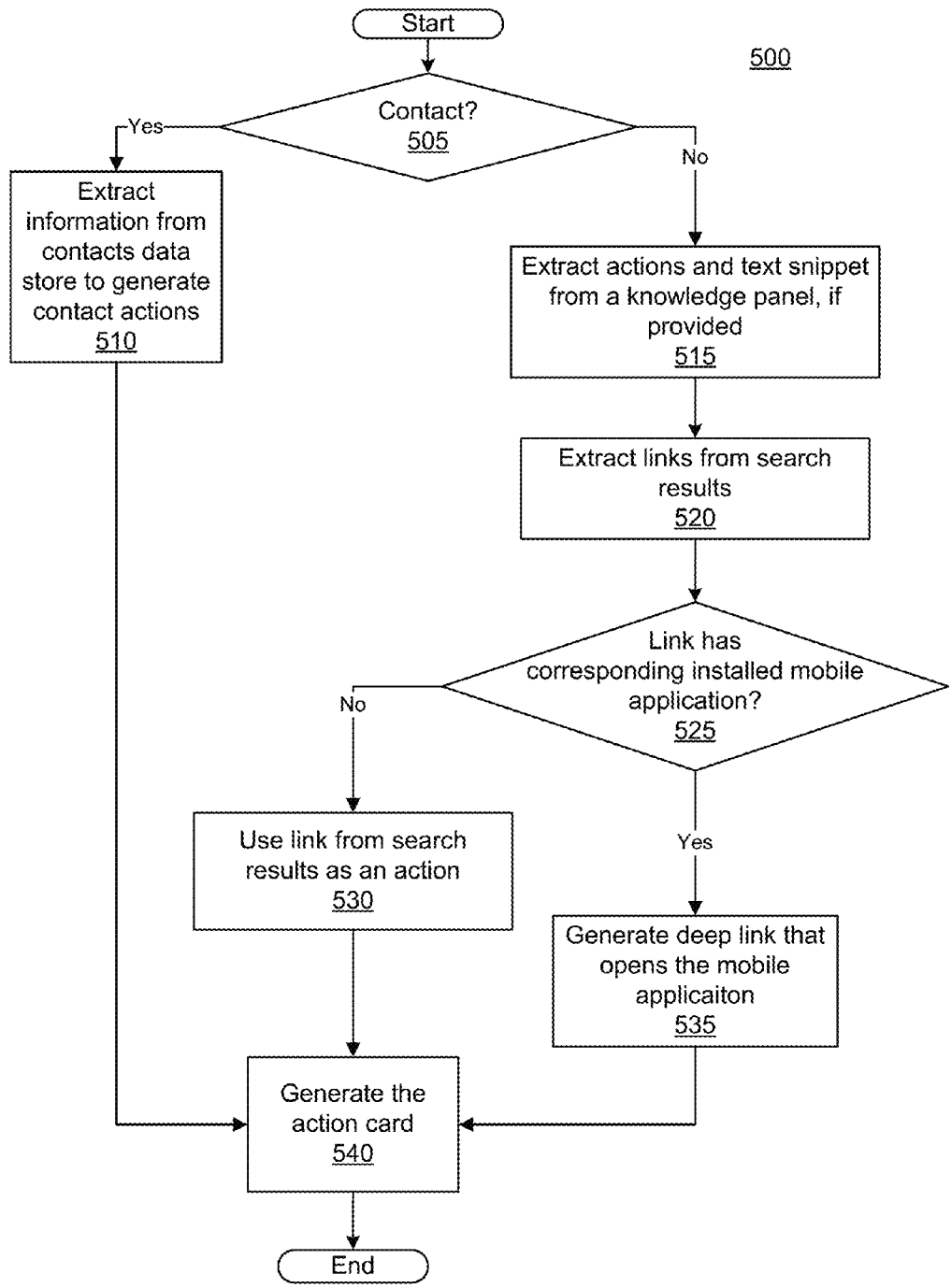
FIG. 5 illustrates a flow diagram of an example process for determining actions for an entity, in accordance with disclosed implementations.

FIG. 5 illustrates a flow diagram of an example process 500 determining actions for an entity, in accordance with disclosed implementations. Process 500 may be performed by a mobile action suggestion system, such as system 100 of FIG. 1, as part of step 440 of FIG. 4. Process 500 may be used to select actions for an entity from the search results and generate the action card using the actions. Process 500 may begin by determining whether the entity is a contact or not (505). A contact is an entity with search results from a contacts data store for the user. If the entity is a contact (505, Yes), the system may use the information extracted from the contacts data store to generate actions (510). In some implementations, the user may have selected actions for contacts, e.g., in the contact actions data store 255 of FIG. 1, and the system may extract information from the contacts data store to initiate the selected actions. For example, if the user has selected initiating a call as a suggested action, the system may extract a phone number for the contact. In other implementations, the system may have default suggested actions. In some implementations, the system may have a hierarchy of suggested actions and if the contact lacks sufficient information for one action, a next action may be selected in its place. For example, if the contact is lacking an email address, the system may select open a social media page for the contact rather than composing an email message as a suggested action. Each suggested action may have an icon associated with it, and the system may generate an action card (540) using the extracted information and contact actions from step 510. The action card may include an icon for each suggested action, the icon being selectable and configured to initiate the corresponding action when selected. In addition, the action card may display a label for the entity and can display other information. For example, the action card for a contact may include a small photo of the contact, a nickname for the contact, etc. Process 500 then ends, having generated an action card for the contact.

If the entity is not a contact (505, No), the system may extract actions from a knowledge panel (515), if one exists in the search results. The types of suggested actions generated may depend on the information shown in the knowledge panel. For example, if the system finds a phone number, the system may generate an action to initiate a call to the phone number. If the system finds an address, the system may generate an action to open a map application to the address. If the system finds link to a wiki page, the system may generate an action that opens the page. If the system finds a review, the system may generate an action that allows the user to write or read reviews for the entity. In addition to generating actions, the system may use the knowledge panel to extract other information to display on the action card. For example, the system may extract a brief description of the entity, a web page for the entity, a label for the entity, etc., from the knowledge panel information. These may be included in the action card. In some implementations, the system may use a machine learning algorithm to predict which information from the knowledge panel is most helpful to the user.

The system may also extract links from the search results (520). The results may represent the highest ranked results from the search engine, e.g., those conventionally displayed on the first page. In some implementations, links that can be turned into deep links (e.g., have a corresponding mobile application) may be automatically selected from the results. Of the remaining links in the search results, the system may select one, two, or all of the links. In some implementations, the system may select remaining links that have a rank above a threshold. In some implementations, the links may be selected based on a machine learning algorithm that predicts the most useful links based on past user-selection of the links. The links may be from the knowledge panel or from the conventional search results. In some implementations, the link may have a corresponding installed mobile application. For example, a link to the domain yelp.com may correspond to a mobile application developed by YELP or another mobile application that performs similar actions. If the link does have a corresponding installed mobile application (525, Yes), the system may generate a deep link for the suggested action (535). The deep link may not only open the mobile application, but open the application with a state relevant to the entity. For example, if the system opens the YELP mobile application, it may open it to the restaurant or movie for which the system is generating the action card. The manner of generating a deep link is operating-system specific and generally known. For example, in an IOS operating system the system may generate a custom URL via an NSURL object, while in an ANDROID operating system the system may use an intent messaging object. Of course, implementations are not limited to any particular operating system. If the link does not have a corresponding installed mobile application (525, No), the system may generate an action that opens a browser application to the document represented by the link (530). When the system has identified the suggested actions and any additional information (e.g., text snippets), the system may generate the action card (540). As discussed above, this may include providing a label, a link to an official website, and selectable icons associated with each suggested action. Process 500 then ends for this entity.

In some implementations, the mobile device may provide feedback regarding frequently selected suggested actions to a server. The server may use the feedback as input to a machine learning algorithm, for example as training data. The machine learning algorithm may be configured to predict the most relevant future actions based on past actions, and could be used to determine suggested actions, as discussed above. The feedback may be treated in one or more ways before it is stored or used at the server, so that personally identifiable information is removed. For example, the data may be treated so that no personally identifiable information can be determined for the user, or a user's geographic location may be generalized where location information is obtained (such as to a city, ZIP code, or state level). In some implementations, the server may periodically provide the mobile device with coefficients and the mobile device may use the coefficients to execute an algorithm to predict likelihood of an action being relevant to a user so that the mobile device can make a prediction without communicating with the server for each prediction. The mobile device may periodically update the server with historical data, which the server may use to calculate updated coefficients. The server may provide the updated coefficients to the mobile device. In some implementations, the user device may operate its own machine learning algorithm to determine prediction coefficients, obviating the need for communication with any other computer.

Figure 6:
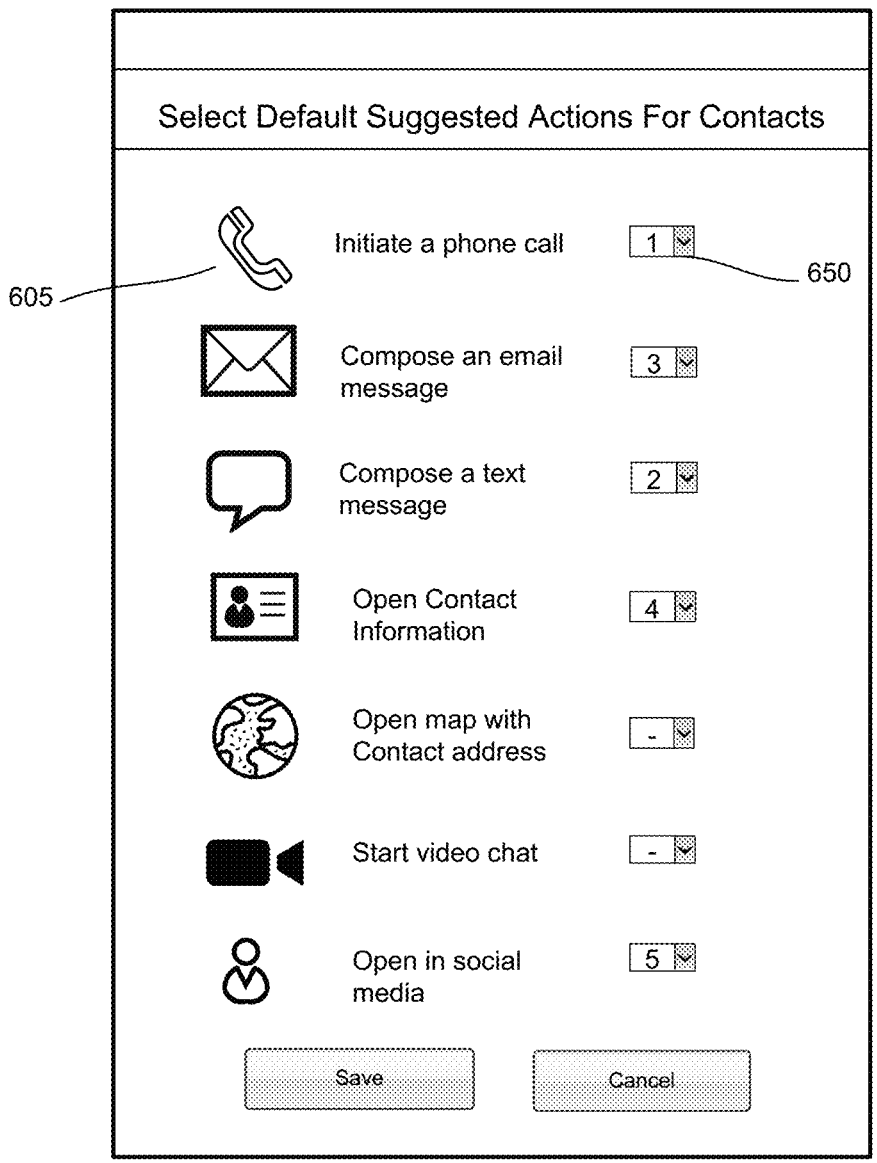
FIG. 6 illustrates an example user interface for selecting default actions, in accordance with disclosed implementations.

FIG. 6 illustrates an example user interface 600 for selecting default actions. In the example interface 600 the suggested actions are for contacts identified in a contact data store. Of course, the system may provide an equivalent user interface for selecting default actions for other entity types, such as movies, restaurants, places, etc. In the example of FIG. 6, the user interface 600 provides an interface that enables a user to specify which suggested actions be displayed in an action card for a contact. The user interface may provide the user with a mechanism or control for selecting the preferred actions and, optionally, for ranking the actions. For example, the user interface 600 provides a list entry for each possible action. Each action can include an icon, such as icon 605, that represents the action on the action card. In addition, the user interface 600 may provide a control, such as drop-down 650. The control may enable the user to select the suggested action a default action. In some implementations, such as that illustrated in FIG. 6 the control may also enable the user to rank the default action and the system may use the rank to generate the action card, so that the highest ranked default action appears first. In some implementations, the system may use the rankings to determine replacement suggested actions. For example, if the contact data store does not have an email address for the contact, the system may skip this default action and use the next ranked default action. Thus, the user interface 600 may enable to user to determine which actions should appear on the action card and the order in which they appear.

FIG. 7 shows an example of a generic computer device 700, which may be operated as system 100, and/or client 170 of FIG. 1, which may be used with the techniques described here. Computing device 700 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 700 includes a processor 702, memory 704, a storage device 706, and expansion ports 710 connected via an interface 708. In some implementations, computing device 700 may include transceiver 746, communication interface 744, and a GPS (Global Positioning System) receiver module 748, among other components, connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 708 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a computing device, such as a laptop computer 732, personal computer 734, or tablet/smart phone/handheld/wearable device 736. An entire system may be made up of multiple computing devices 700 communicating with each other. Other configurations are possible.

FIG. 8 shows an example of a generic computer device 800, which may be system 100 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880a includes multiple racks 858a-858n. Each rack may include one or more processors, such as processors 852a-852n and 862a-862n. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 800.

Each rack may include memory, such as memory 854 and memory 864, and storage, such as 856 and 866. Storage 856 and 866 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 854 may also be shared between processors 852a-852n. Data structures, such as an index, may be stored, for example, across storage 856 and memory 854. Computing device 800 may include other components not shown, such as controllers, buses, input/output devices, communications modules, etc.

An entire system, such as system 100, may be made up of multiple computing devices 800 communicating with each other. For example, device 880a may communicate with devices 880b, 880c, and 880d, and these may collectively be known as system 100. As another example, system 100 of FIG. 1 may include one or more computing devices 800. Some of the computing devices may be located geographically close to each other, and others may be located geographically distant. The layout of system 800 is an example only and the system may take on other layouts or configurations.

According to certain aspects of the disclosure, a method includes performing recognition on content captured from a display of a mobile device, identifying a plurality of entities in the content, and issuing a respective query for each of the plurality of entities. The method also includes ranking the plurality of entities based on search results returned for the respective queries, generating a respective action card for at least some of the highest ranked entities, and providing the action cards for display to a user of the mobile device.

These and other aspects can include one or more of the following features. For example, issuing a query for a first entity of the plurality of entities can include determining, using a name classifier, that the first entity may be a name, querying a contacts data store associated with the user of the mobile device using the first entity, and returning information from the contacts data store as search results for the query when the first entity corresponds to a contact in the contacts data store. In such an implementation, issuing the query for the first entity can also include issuing the query for the first entity to a search engine when the first entity fails to correspond to a contact in the contacts data store. As another example, the search results for a query include information regarding a popularity of the query and an entity corresponding to a popular query may receive a boost in rank. As another example, an entity of the plurality of entities having search results that include results from a graph-based data store may receive a boost in rank. As another example, generating the action card for a first entity can include identifying a link in the search results and determining that a domain for the link corresponds to a mobile application installed on the mobile device, wherein the action card includes an action that opens the mobile application. As another example, a first entity of the plurality of entities may correspond to a contact in a contacts data store and generating the action card for the first entity can include determining default actions selected by the user for contact entities and generating the action card using information from the contacts data store for the contact that corresponds to the default actions.

According to certain aspects of the disclosure, a system comprises at least one processor; an indexed document corpus, a graph-based data store, and memory storing instructions that, when executed by the at least one processor cause the system to perform operations. The operations may include performing recognition on content captured from a display of a mobile device and identifying a plurality of entities in the content. For each of the plurality of entities, the operations may also include issuing a respective query to a search engine for the entity, the search engine searching the graph-based data store and the indexed document corpus to generate search results for the entity. The operations may further include ranking the plurality entities based on the search results and providing the plurality of entities with respective rank and search results to the mobile device, the mobile device generating action cards for at least some of the highest ranked entities generated using the respective search results.

These and other aspects can include one or more of the following features. For example, a first entity of the plurality of entities that has a corresponding entity in the graph-based data store may receive a boost in rank. As another example, ranking the plurality of entities can include determining a frequency of queries relating to a first entity; and boosting the rank of the first entity when the frequency meets a threshold or is greater than a frequency of queries relating to a second entity.

According to certain aspects of the disclosure, a system comprises a contacts data store, at least one processor, and memory storing instructions that, when executed by the at least one processor, cause the system to perform operations. The operations may include performing recognition on content displayed on a display of a mobile device, identifying an entity in the content, and determining at least one contact in the contacts data store that corresponds to the entity. The operations may also include generating an action card for the entity, the action card having a first action that uses first information from the contacts data store for the contact and a second action that uses second information from the contacts data store for the contact, and displaying the action card on the display.

These and other aspects can include one or more of the following features. For example, the entity is a first entity and the action card is a first action card and the memory further stores instructions that, when executed by the at least one processor, cause the mobile device to identify a second entity in the content, for the second entity, issue a query to a search engine, the query including the second entity, receive, from the search engine, results for the query, identify actions associated with the second entity based on the results, generate a second action card having the identified actions, and display the second action card with the first action card on the display. In some such implementations, the first action card may be displayed in a position of prominence based on the first entity corresponding to the contact. Alternatively or in addition, such implementations may also include a graph-based data store, wherein the results for the query include information from the graph-based data store for the second entity.

As another example, the first action can initiate a first mobile application and the second action may initiate a second mobile application. In addition, the memory may further store instructions that, when executed by the at least one processor, cause the mobile device to receive a selection of the first action and launch the first mobile application using the first information. As another example, performing recognition on the content displayed on the display can include examining accessibility data generated for the content displayed on the display. As another example, identifying the entity can includes using a name classifier to determine a set of words that may represent a name. As another example, the entity may be a first entity, the action card may be a first action card, and the contact may be a first contact and the memory nat further stores instructions that, when executed by the at least one processor, cause the mobile device to determine a second contact in the contacts data store that corresponds to a second entity identified in the content, generate a second action card for the second contact, determine a frequency of interaction for the first contact is higher than a frequency of interaction for the second contact, and display the first action card in a position of prominence with regard to the second action card.

As another example, the contact may be a first contact and the memory further stores instructions that, when executed by the at least one processor, may cause the mobile device to determine a second contact in the contacts data store that corresponds to the entity, determine a frequency of interaction for the first contact is higher than a frequency of interaction for the second contact; and select the first contact as corresponding to the entity. As another example, the contacts data store may be a contacts data store for a user of the mobile device that is stored remote from the mobile device.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    performing recognition on content captured from a display of a mobile device;
    identifying a plurality of entities in the content;
    issuing a respective query for each of the plurality of entities;
    ranking the plurality of entities based on search results returned for the respective queries;
    determining that the search results for a first entity of the highest ranked entities includes a knowledge panel;
    extracting information from the knowledge panel for the first entity;
    generating a respective action card for at least one of the highest ranked entities, including the first entity, wherein each of the respective action cards includes at least three actions per entity and the actions for the respective action card for the first entity are generated from the information extracted from the knowledge panel and the action card for the first entity includes text extracted from the knowledge panel; and
    providing the respective action cards for display to a user of the mobile device, wherein the mobile device displays the action cards.

2. The method of claim 1, wherein issuing a query for a first entity of the plurality of entities includes:
    determining, using a name classifier, that the first entity is classified as a name;
    querying a contacts data store associated with the user of the mobile device using the first entity; and
    returning information from the contacts data store as search results for the query when the first entity corresponds to a contact in the contacts data store.

3. The method of claim 2, wherein issuing the query for the first entity further includes:
    issuing the query for the first entity to a search engine when the first entity fails to correspond to a contact in the contacts data store.

4. The method of claim 1, wherein the actions for the first entity are extracted from the knowledge panel by a machine learning algorithm trained on feedback regarding previously selected actions.

5. The method of claim 1, wherein an entity of the plurality of entities having search results that include results from a graph-based data store receives a boost in rank.

6. The method of claim 1, wherein generating the respective action card for an entity of the highest ranked entities includes:
    identifying a link in the search results for the entity;
    determining that a domain for the link corresponds to a mobile application installed on the mobile device; and
    generating a deep link into the mobile application, the deep link having a state that relates to the entity,
    wherein the action card includes an action that opens the mobile application using the deep link.

7. The method of claim 1, wherein a second entity of the plurality of entities corresponds to a contact in a contacts data store and generating the action card for the second entity includes:
    determining default actions selected by the user for contact entities; and
    generating the action card using information from the contacts data store for the contact that corresponds to the default actions.

8. A system comprising:
    at least one processor;
    an indexed document corpus;
    a graph-based data store; and
    memory storing instructions that, when executed by the at least one processor cause the system to perform operations comprising:
        performing recognition on content captured from a display of a mobile device,
        identifying a plurality of entities in the content,
        for each of the plurality of entities, issuing a respective query to a search engine for the entity, the search engine searching the graph-based data store and the indexed document corpus and generating search results for the entity,
        ranking the plurality of entities based on the search results, the search results for a first entity including a knowledge panel,
        extracting information from the knowledge panel for the first entity, and providing the plurality of entities with respective ranks and search results to the mobile device, the mobile device generating action cards for at least one of the highest ranked entities using the respective search results, wherein the action cards include at least three actions per entity and wherein the actions for the action card for the first entity are generated from the information extracted from the knowledge panel.

9. The system of claim 8, wherein a first entity of the plurality of entities that has a corresponding entity in the graph-based data store receives a boost in rank.

10. The system of claim 8, wherein ranking the plurality of entities includes:
determining a frequency of queries relating to a first entity; and
boosting the rank of the first entity when the frequency meets a threshold or is greater than a frequency of queries relating to a second entity.

11. A system comprising:
a contacts data store;
at least one processor; and
memory storing instructions that, when executed by the at least one processor, cause the system to:
perform recognition on content displayed on a display of a mobile device,
identify a first entity and a second entity in the content,
determine a contact in the contacts data store that corresponds to the first entity,
generate a first action card for the first entity, the action card having a first action that uses first information from the contacts data store for the contact and a second action that uses second information from the contacts data store for the contact,
obtain search results for the second entity from a search engine, the search results including a knowledge panel for the second entity,
extract information from the knowledge panel for the second entity,
generate a second action card for the second entity from the information extracted from the knowledge panel, the action card including at least three actions, and
display the first action card and the second action card on the display.

12. The system of claim 11, wherein the memory further stores instructions that, when executed by the at least one processor, cause the mobile device to:
determine a frequency of interactions with the contact;
determine that the frequency fails to meet a threshold; and
display the second action card in a position of prominence over the first action card.

13. The system of claim 11, wherein the first action card is displayed in a position of prominence based on the first entity corresponding to the contact.

14. The system of claim 11, wherein the at least three actions for the second entity are extracted from the knowledge panel by a machine learning algorithm trained on feedback regarding previously selected actions for entities having an entity type of the second entity.

15. The system of claim 11, wherein the first action initiates a first mobile application and the second action initiates a second mobile application.

16. The system of claim 15, wherein the memory further stores instructions that, when executed by the at least one processor, cause the mobile device to:
receive a selection of the first action; and
launch the first mobile application using the first information.

17. The system of claim 11, wherein performing recognition on the content displayed on the display includes:
examining accessibility data generated for the content displayed on the display.

18. The system of claim 11, wherein identifying the entity includes using a name classifier to determine a set of words that are classified as a name.

19. The system of claim 11, wherein the contact is a first contact and the memory further stores instructions that, when executed by the at least one processor, cause the mobile device to:
determine a second contact in the contacts data store that corresponds to a third entity identified in the content;
generate a third action card for the second contact;
determine a frequency of interaction for the first contact is higher than a frequency of interaction for the second contact; and
display the first action card in a position of prominence with regard to the third action card.

20. The system of claim 11, wherein the contact is a first contact and the memory further stores instructions that, when executed by the at least one processor, cause the mobile device to:
determine a second contact in the contacts data store that corresponds to the entity;
determine a frequency of interaction for the first contact is higher than a frequency of interaction for the second contact; and
select the first contact as corresponding to the first entity.

21. The system of claim 11, wherein the contacts data store is a contacts data store for a user of the mobile device that is stored remote from the mobile device.

* * * * *